United States Patent [19]

Deichert et al.

[11] 4,277,595

[45] Jul. 7, 1981

[54] WATER ABSORBING CONTACT LENSES MADE FROM POLYSILOXANE/ACRYLIC ACID POLYMER

[75] Inventors: William G. Deichert, Macedon, N.Y.; Gregory C. Niu, Lexington; Martin F. VanBuren, Chelmsford, both of Mass.

[73] Assignee: Bausch & Lomb Incorporated, Rochester, N.Y.

[21] Appl. No.: 74,944

[22] Filed: Sep. 13, 1979

[51] Int. Cl.$^3$ ..................... C08G 77/14; C08F 220/06
[52] U.S. Cl. ................................ 528/26; 351/160 H; 525/479; 526/279
[58] Field of Search ...................... 525/479; 526/279; 528/26; 351/160 H

[56] References Cited

U.S. PATENT DOCUMENTS

| | | | |
|---|---|---|---|
| 2,770,633 | 11/1956 | Sommer | 260/448.2 |
| 2,793,223 | 5/1957 | Merker | 260/448.2 |
| 2,865,885 | 12/1958 | de Benneville et al. | 526/279 |
| 2,906,735 | 9/1959 | Speirer | 528/26 |
| 2,922,807 | 1/1960 | Merker | 260/448.2 |
| 3,041,362 | 6/1962 | Merker | 260/448.2 |
| 3,041,363 | 6/1962 | Merker et al. | 260/448.2 |
| 3,228,741 | 1/1966 | Becker | 351/160 |
| 3,341,490 | 9/1967 | Burdick et al. | 260/37 SB |
| 3,518,324 | 6/1970 | Polmanteer | 351/160 |
| 3,763,081 | 10/1973 | Holub et al. | 260/37 SB |
| 3,808,178 | 4/1974 | Gaylord | 351/160 |
| 3,878,263 | 4/1975 | Martin | 260/448.2 B |
| 3,996,187 | 12/1976 | Travnicek | 260/37 SB |
| 3,996,189 | 12/1976 | Travnicek | 260/37 SB |
| 4,136,250 | 1/1979 | Mueller et al. | 528/29 |
| 4,138,382 | 2/1979 | Polmanteer | 526/279 |
| 4,153,641 | 5/1979 | Deichert et al. | 526/279 |

FOREIGN PATENT DOCUMENTS 7704136  4/1977  Netherlands.

OTHER PUBLICATIONS

Katz et al., *J. Polymer Science:* Symposium No. 46, (1974), pp. 139–148.
Katz et al., *J. Polymer Science: Polymer Chemistry Edition,* vol. 13, (1975), pp. 645–658.
Katz et al., *J. Polymer Science: Polymer Chemistry Edition,* vol. 16, (1978), pp. 597–614.
Piccoli et al., *J. Am. Chem. Society,* vol. 82, (4/1960), pp. 1883–1885.
Merker et al., *J. of Polymer Science,* vol. XLIII, (1960), pp. 297–310.
Bostick, *Kinetics & Mechanisms of Polymerization,* vol. 2-(1969), pp. 343–357.
Bostick, *Chemical Reactions of Polymers,* High Polymer Series, vol. 19, (1964), p. 525.

*Primary Examiner*—Wilbert J. Briggs, Sr.
*Attorney, Agent, or Firm*—Robert M. Phipps; Frank C. Parker

[57] ABSTRACT

Monomeric polysiloxanes end-capped with activated unsaturated groups are copolymerized with acrylic acid to form hydrophilic, water absorbing polysiloxane contact lenses. These contact lenses are unexpectedly capable upon hydration of retaining from 1 percent to about 99 percent by weight, based upon the total weight of the copolymer, of water.

24 Claims, 1 Drawing Figure

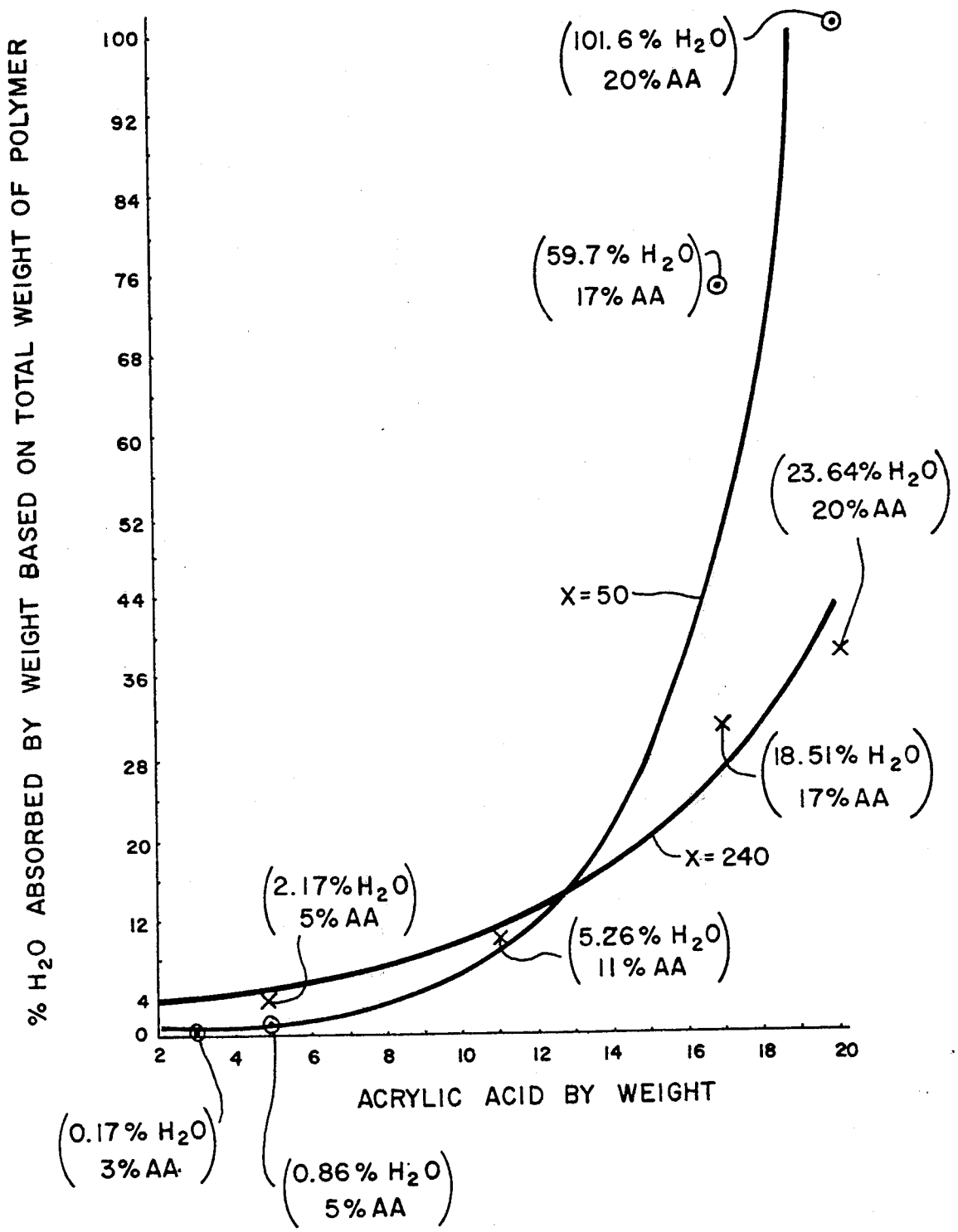

WATER ABSORBING CONTACT LENSES MADE FROM POLYSILOXANE/ACRYLIC ACID POLYMER

BACKGROUND OF THE INVENTION

1. Field of the Invention

It was discovered that the hydrophobic properties of certain polysiloxanes could be altered through copolymerization with acrylic acid to form a copolymer which unexpectedly possessed water absorbing properties sufficiently that when the copolymer was saturated with water the copolymer retained from about 1 percent to about 99 percent by weight, based on the total weight of the copolymer, of water.

The instant contact lenses comprise water absorbing hydrophilic, flexible, fillerless, hydrolytically stable, biologically inert, transparent contact lenses which have the capability of transporting oxygen sufficiently to meet the requirements of the human cornea. These lenses comprise a polysiloxane monomer $\alpha,\omega$ terminally bonded through divalent hydrocarbon groups to polymerized, free radical polymerizably activated, unsaturated groups copolymerized with acrylic acid forming a polymer in a crosslinked network capable upon saturation with water of retaining from about 1 percent to above 99 percent by weight, based on the total weight of the polymer, of water.

2. Prior Art Statement

U.S. Pat. No. 4,153,641 teaches contact lenses made from polymers and copolymers comprising poly(organosiloxane) polymers and copolymers formed by polymerizing a poly(organosiloxane) monomer $\alpha,\omega$ terminally bonded through divalent hydrocarbon groups to polymerized, free radical polymerizably activated, unsaturated groups forming a polymer in a crosslinked network. Additionally, specific comonomers are disclosed which include lower esters of acrylic and methacrylic acid, styryls and N-vinyl pyrrolidinone which may be copolymerized with the above described poly(organosiloxane) monomer to form a copolymer. The instant invention preferred polysiloxane monomers include the same poly(organosiloxane) monomers described above. However, it was unexpectedly discovered that when the poly(organosiloxane) monomers described above were copolymerized with acrylic acid a water absorbing polysiloxane copolymer was formed. This copolymer is extremely suitable for making hydrophilic, water absorbing, soft contact lenses. It is generally known in the siloxane art that siloxanes are hydrophobic. There are a few instances where the art teaches hydrophobic polysiloxanes. We know of only one instance, in addition to the instant invention, where a polysiloxane is disclosed which is capable of absorbing water. However, this known material as disclosed in U.S. Pat. No. 4,136,250 would not be suitable for making the instant contact lens for the reasons stated herein concerning U.S. Pat. No. 4,136,250 as prior art. As mentioned, unexpectedly it was discovered that when the instant polysiloxanes were copolymerized with acrylic acid that not only was the resulting copolymer hydrophilic but when the copolymer was saturated with water this copolymer unexpectedly absorbed from about 1 percent to about 99 percent by weight, based on the total weight of the copolymer, of water.

U.S. Pat. No. 4,136,250 teaches in pertinent part, a water absorbing polysiloxane which may be used to make soft contact lenses which is obtained by copolymerizing the following siloxane monomer:

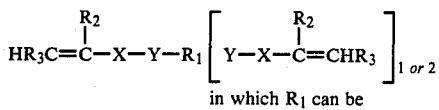

in which $R_1$ can be

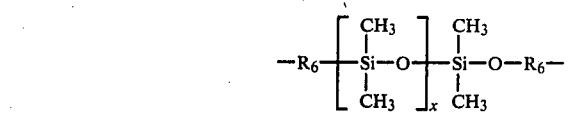

with a variety of hydrophilic monomers including acrylic acid. The above siloxane monomers can be reduced to a formula similar to but yet critically different from the instant polyorganosiloxane monomers. From the pertinent teachings of U.S. Pat. No. 4,136,250 the following siloxane monomer may be derived:

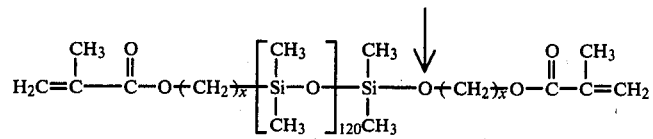

The oxygen atom in the monomer backbone with the arrow pointing to it is present in the '250 formula but not present in the instant polyorganosiloxane monomers. This oxygen atom presents several problems. This particular oxygen atom, because of its placement between the silicone and carbon atoms, is subject to hydrolysis and alcoholysis. This stability is important if this material is to be used for biomedical devices, such as contact lenses, since these types of devices are usually heated in order to disinfect them. If, during heating the contact lens loses it shape, then it loses its optics. This means that the material taught in '250 would be undesirable for use in certain medical devices including contact lenses. The instant polyorgansiloxane monomers result in copolymers which have superior hydrolytic stability since there is no Si-O-C linkage.

Also to be considered are the examples of '250. Only in these examples of '250 are there specific monomers disclosed without this undesirable Si-O-C linkage. However, these specific monomers have undesirable urethane linkages or couplings which present structures which are even more different from the instant monomers. The urethane linkages, i.e.,

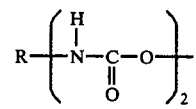

is as mentioned, also undesirable for use in medical devices, particularly contact lenses. However, in addition, the instant polyorganosiloxane monomers have no urethane linkages.

U.S. Pat. No. 4,138,382 teaches, in pertinent part, a hydrophilic, water swellable, crosslinked copolymer gel. This copolymer gel is a hydrogel, such as N-vinylpyrrolidone crosslinked with a low molecular weight siloxane. The siloxane component is a very small constituent and is present for the purpose of crosslinking. The siloxane is not present in amounts more than about 2 percent by weight. This does not teach a hydrophilic, water absorbing siloxane, much less, a contact lens made therefrom.

Dutch Pat. No. 7,704,136 published Oct. 18, 1977 teaches, in pertinent part, a wettable siloxane material for use in making contact lenses. However, '136 teaches that the wettable contact lenses should not absorb water since water absorption, as taught in '136, would cause water to be discharged into the eye when the contact lenses are in use. This is viewed as a disadvantage in '136. The instant invention concerns a polysiloxane contact lens which absorbs water in larger amounts. Water absorption is viewed by the instant inventors as an advantage. The Dutch reference '136 further teaches that a lens should not absorb water since, as taught in '136, such a lens would undergo changes, such as, changing its optical properties. '136 further teaches that the handling of such a lens is difficult because when it is swellable it is physically weak. However, the instant lenses are made from wettable polysiloxane material which is strong, durable, water absorbing and oxygen permeable. The Dutch patent further refers to some of the monomers which may be reacted with the polysiloxanes taught in '136 which are esters of glycidyl alcohol and esters of certain acids including acrylic acid and methacrylic acid. '136 also suggests the use of specific anhydrides such as maleic anhydride. Nowhere does this Dutch reference '136 disclose the instant polysiloxanes or that acrylic acid may be reacted with these monomeric siloxanes in order to form the instant water absorbing copolymer as disclosed herein.

U.S. Pat. No. 3,808,178 discloses, in pertinent part, a polymeric material containing a polymethacrylate backbone with relatively short poly(organosiloxane) ester side chains on the backbone polymer. There is no crosslinking involved in '178 since the monomers disclosed in '178 are monofunctional, i.e., have only one functional group on each monomer. In order to get crosslinking in '178 it is taught at column 5 of '178 that different monomers must be added for crosslinking which have more than one functionality. However, in the instant invention crosslinking is obtained since each siloxane monomer is difunctional, i.e., each siloxane monomer contains two functional groups, most preferably two methacrylate groups which results in crosslinking. Not only does '178 not teach the polysiloxanes monomers used in the instant invention but '178 does not remotely teach making the instant hydrophilic siloxane which is also water absorbing for use as soft, hydrophilic, water absorbing contact lens.

Katz and Zewi, "Correlations Between Molecular Structure and Some Bulk Properties of Highly Crosslinked Polysiloxane", *J. Polymer Sci.*, Vol. 46, pages 139–148 (1974) teaches, in pertinent part, that divinyl monomers can be prepared by esterification of the carboxyl-terminated compounds with two molecules of a monoester of ethylene glycol and a monoester of acrylic acid. Polymerization can be effected by ultraviolet radiation at room temperature. Also taught is the structure as shown on page 146 of the Katz et al article. If this formula was broken down as it relates to the preferred siloxane comonomers taught in the instant application, the formula would be as follows:

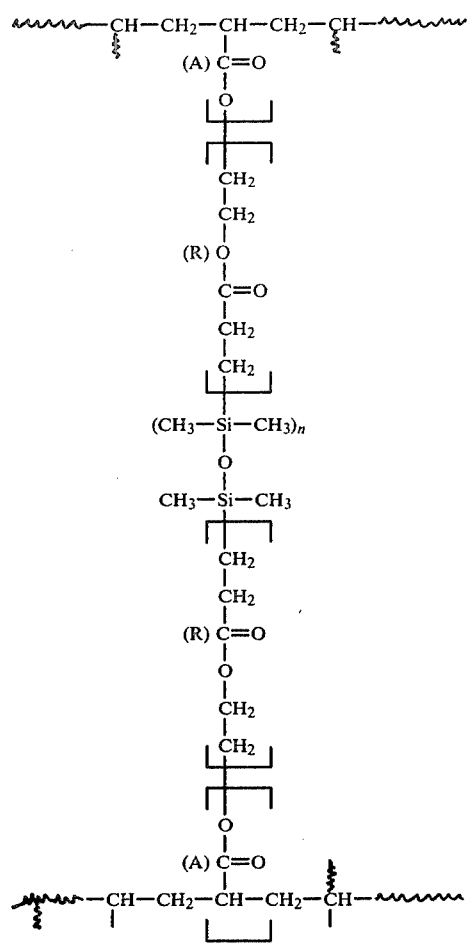

In the above formula the R group has an ester linkage whereas in the instant preferred siloxane comonomers the R is a hydrocarbon group.

Also in the above formula the center repeating unit is a dimethyl siloxane unit whereas the center repeating unit in the instant preferred siloxane comonomers is a poly (organosiloxane) repeating unit as illustrated below. The R linkage in the Katz et al paper is not as hydrolytically stable as the hydrocarbon linkage in the instant preferred siloxane comonomers. The ester group in Katz et al can be hydrolyzed. This stability is important if this material is to be used in soft contact lenses or biomedical devices since these types of devices are usually heated in order to disinfect them. As mentioned, if the contact lens loses its shape, then it loses its optics. It should be understood that the instant preferred polysiloxane comonomers to have an ester linkage. However, this linkage is between the A and the R groups. It is actually located in the A group as illustrated below by a formula of one of the most preferred monomeric siloxanes of the instant invention.

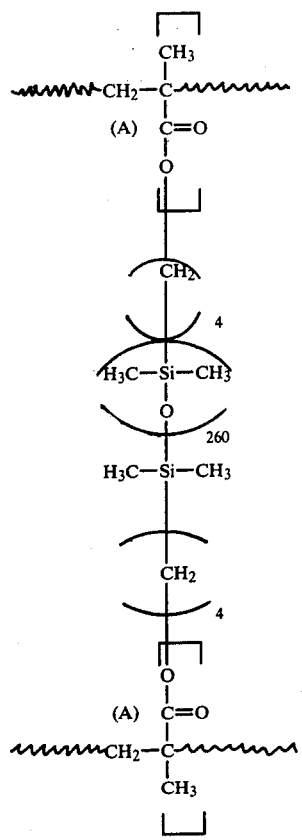

This Katz et al reference, in addition to teaching the specific formula on page 146, merely teaches that phase differences are detectable as the siloxane chain length is decreased. As the siloxane chain increases in length, Katz et al teaches that the phase differences are lost and these differences merge into one continuous transition.

In addition to the above, it is important to note that Katz et al does not suggest any usage for this material.

Katz and Zewi "Some Rheological Properties of Highly Crosslinked Polysiloxanes" *J. Polymer Sci.*, Vol. 13, pages 645-658 (1975) teaches, in pertinent part, the same materials as taught in the above cited (1974) article by Katz et al. This article teaches in more detail the steps necessary in order to make the starting materials for the polymer as taught in the '74 article. Katz et al is teaching in this article, in pertinent part, how to synthesize the carboxyl terminated siloxane. This is illustrated in pages 646-647. Katz et al then crosslinks this using a different chemical reaction than in the instant application in order to make the polymer as shown on page 649. This polymer is not related in any way to the instant materials. In addition to the above, it is important to note that this Katz et al reference also makes no mention of any uses of the material.

Katz and Zewi "Microheterogeneity in Crosslinked Polysiloxane" *J. Polymer Sci.*, Polymer Chemistry Edition, volume 16, pages 597-614 (March, 1978) teaches, in pertinent part, the same materials as taught in the above cited (1974) and (1975) articles by Katz et al. The only new material mentioned appears on page 598, line 8, i.e., crosslinked polyesters. However, these crosslinked polyesters are not pertinent to the instant application. Katz et al is teaching in this article, in pertinent part, how to prepare certain monomers. Katz et al is merely suggesting the same crosslinked material as he suggested in his earlier (1974) and (1975) articles. Katz et al then discusses the physical properties and the microheterogeneity of these crosslinked polymers. He discusses the difference in the phase separation on the submicroscopic scale. As to the physical properties, which Katz et al mentioned in his article on page 597, he discusses the physical properties in general of polysiloxanes. Katz et al discusses specific properties of his polymers at page 609 where he presents modulus-temperature data. Then he discusses crosslinking efficiency on page 607. He is measuring properties which will give him an idea of his efficiency of crosslinking. Again, it should be stated that Katz et al in this (1978) article teaches no more material than he taught in his earlier articles except for the disclosure of the crosslinked polyesters on page 598. However, these materials are not relevant to the instant application. In addition to the above, it is important to note that this Katz reference also makes no mention of any uses of this material except as possible sealants.

W. A. Piccoli, G. G. Haberland and R. L. Merker, *J. Am. Chem. Soc.* "Highly Strained Cyclic Paraffin-Siloxanes", vol. 82, p. 1883-1885 (Apr. 20, 1960) teaches, in pertinent part, the preparation of the cyclic paraffin-siloxane monomers which may be used in the instant invention to make the instant preferred siloxane prepolymers. These preferred siloxane prepolymers, i.e., linear monomers, in the instant invention are then copolymerized and crosslinked to form the preferred polymers used for making contact lenses. It is disclosed on page 1884, column 2, lines 15-27, of the above article that these cyclic paraffin-siloxane monomers may be polymerized using strong acids or bases to form linear polymers. The preferred siloxane linear polymers, as mentioned, are used in the instant invention as preferred prepolymers and copolymerized and crosslinked to form materials for making contact lenses. Nowhere does the article disclose or suggest the crosslinked water absorbing polysiloxane copolymers of the instant invention.

R. L. Merker and M. J. Scott *J. of Polymer Sci.*, "The Copolymerization of Cyclic Siloxanes" Vol. 43, p. 297-310 (1960) teaches, in pertinent part, copolymerization studies using cyclic alkyl siloxanes. These materials are copolymerized with silethylene siloxane and then the rates of polymerization are determined. The silethylene siloxane is used because it does not equilibrate between the ring form and the linear form. Once the ring form is broken the ring stays open, that is, the reaction is kept going in one direction. The crosslinked polymers of the instant invention are not suggested or taught by this article nor is the use of these polymers as contact lenses taught or suggested.

U.S. Pat. Nos. 3,041,362 and 3,041,363 teach, in pertinent part, the same materials as taught in the above mentioned articles coauthored by Merker in the *J. Am. Chem. Soc.* and *J. of Polymer Sci.* However, in addition, it is taught that some polyfunctional siloxanes may be used with certain monomers to give crosslinked polymers and copolymers. However, the crosslinked copolymers of the instant invention are not taught or suggested by these references. Furthermore, it is not taught or suggested by these references that these polymers could be used as contact lenses.

E. E. Bostick, "Cyclic Siloxanes and Silazanes", Chapter 8, p. 343-357, *Kinetics and Mechanisms of Polymerization,* Vol. 2, Frisch and Regan ed., (1969) teaches, in pertinent part, siloxane polymerization using cyclic siloxanes. This article teaches no more than the above mentioned article from *J. of Polymer Sci.* by R. L. Merker and M. J. Scott.

E. E. Bostick, *Chemical Reactions of Polymers,* High Polymers series vol. 19 (1964) E. M. Fettes, ed. chapter 7 "Interchange Reactions" section B "Silicones" p. 525 teaches, in pertinent part, siloxane copolymerization using cyclic siloxanes. It teaches that these reactions go in one direction. This article teaches no more than the above mentioned article from *J. of Polymer Sci.* by R. L. Merker and M. J. Scott.

U.S. Pat. No. 2,770,633 discloses 1,3-bis(4-methacryloxybutyl) tetramethyl disiloxane, one of the preferred siloxane monomers used in the instant invention. This is taught at column 1, line 63 of '633 when R equals vinyl. However, '633 teaches only the siloxane monomer whereas the instant invention teaches not only the siloxane monomers but the copolymer made from copolymerization of the polysiloxane monomer with acrylic acid to form a hydrophilic, water absorbing polysiloxane material for use in making soft contact lenses. '633 would not want the monomer disclosed in '633 to polymerize since it would not perform its intended function as a lubricant if polymerized.

U.S. Pat. Nos. 3,996,187, 3,996,189, 3,341,490 and 3,228,741 disclose, in pertinent part, contact lenses fabricated from poly(organosiloxanes) containing fillers. The tear strength and tensile strength of the contact lenses made from the instant polymer are of sufficient strength so that no fillers are required.

U.S. Pat. Nos. 3,996,187 and 3,996,189, as mentioned above, disclose contact lenses made from reinforced polysiloxanes. The lenses contain various polysiloxanes with index of refractions similar to the silica filler so that an optically clear silica filled silicone elastomer can be formed from aryl and alkyl siloxanes. The material contains from 5 to 20 percent silica. The silica is used, as mentioned, for strength. The instant invention contains no fillers for strength since the instant material has sufficient strength without fillers.

U.S. Pat. No. 3,341,490 discloses contact lenses made from blends of siloxane copolymers containing reinforcing silica fillers. As mentioned, the contact lenses of the instant invention contain no fillers.

U.S. Pat. No. 3,228,741 discloses contact lenses made from silicone rubber, particularly hydrocarbon substituted polysiloxane rubber. This silicone material contains fillers such as pure silica to control flexibility, pliability and resiliency of the lenses. The instant polymers require no fillers.

U.S. Pat. No. 3,518,324 teaches vulcanizing to make silicone rubber whereas the instant invention is concerned with contact lenses made from polymerizing specific monomers.

U.S. Pat. No. 3,878,263 teaches one configuration which may be

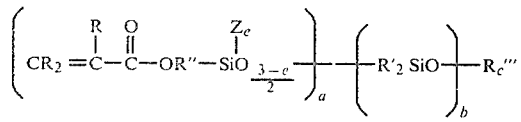

Rs may be monovalent hydrocarbons.
R' may be a monovalent hydrocarbon.

c may equal zero but when c equals zero then at least one Z must be OR''''.

Z is an important ingredient since this is used to crosslink the chains. Therefore, the monomers of the instant invention are not taught in '263.

U.S. Pat. No. 2,906,735 teaches a reaction between an alkyl siloxane and acrylic acid or a methacrylic acid resulting in a disiloxane terminated by acrylate groups. '735 does not teach the water absorbing copolymers of the instant invention.

U.S. Pat. No. 2,922,807 discloses disiloxanes having acryloxy or methacryloxy groups attached to the silicone through a divalent alkylene radical of from 2 to 4 carbon atoms.

U.S. Pat. No. 3,763,081 discloses, in pertinent part, the polymerization of an unsaturated siloxane which is somewhat difficult to polymerize since a double bond in this type of monomer generally is not very active. One must use both high temperatures and a peroxide catalyst or a platinum catalyst in order to complete this type of reaction. See, for example, '081 at column 4 lines 35-46. In the instant preferred reaction the monomeric materials are referred to specifically as having activated unsaturated groups bonded through a divalent hydrocarbon group to the siloxane whereas '081 has no activated unsaturated groups bonded to the siloxane.

U.S. Pat. No. 2,865,885, in pertinent part, teaches a vinyl group which is not activated as shown in column 1, lines 25-30 of '885. The reason '885's double bond is not "active" in the sense as defined in the instant application is that the double bond is bonded to either sulfur or oxygen. In the instant invention this same position would have a

carbonyl group. This would make the double bond active as defined in the instant application. Therefore, '885 since the reactivity ratios are so different, i.e., the double bond is not active in '885 as defined in the instant invention, it would be very difficult to get an acceptable copolymerization reaction using the formulae of '885 as compared to the active double bond in the instant siloxane monomers which are easily copolymerized. In the instant invention the vinyl groups are "activated" to facilitate free radical polymerization. The formula given at column 1, lines 25-30 of '885 does not lend itself to free radical polymerization due to the lack of resonance but rather it lends itself to ionic polymerization due to the polar nature of the substituents. Therefore, it would be extremely difficult, if at all possible, for '885 to form the compounds of the instant invention. Also, the compounds formed in '885 are not hydrolytically stable because of the presence of the silicone-nitrogen bond in the formula. The instant invention cannot use a hydrolytically unstable compound. Furthermore, the products of this hydrolysis in '885 could be injurious to the human eye particularly the amines. Also, at column 3 of '885 the linkage is an amine linkage to the double bond and in the instant invention this linkage is always an alkyl. Therefore, '885 does not teach the instant siloxane monomers much less the instant water absorbing copolymers.

U.S. Pat. No. 2,793,223 teaches, in pertinent part, at Example 5 at column 3, lines 30-41 that a phenyl group is attached to the siloxane. Therefore, that material would be very hard and opaque. This would be unsuitable for contact lenses which must be transparent. Furthermore, contact lenses made from the polymers made from the monomers disclosed in '223, because of the presence of the phenyl group on the siloxane as shown in Example 5 of '223, would not transport oxygen sufficiently whereas contact lenses made from the instant polymers would transport oxygen sufficiently to meet the oxygen requirements of the human cornea.

SUMMARY OF THE INVENTION

The instant invention provides materials which can be used for biomedical devices, such as, contact lenses, heart valves and intraocular lenses.

The instant invention comprises a water absorbing, soft, hydrophilic, flexible, fillerless, hydrolytically stable, biologically inert, transparent contact lens with the capability of transporting oxygen sufficiently to meet the requirements of the human cornea. The instant contact lenses are prepared from a material comprising a polysiloxane monomer $\alpha,\omega$ terminally bonded through divalent hydrocarbon groups to polymerized, free radical polymerizably activated, unsaturated groups copolymerized with acrylic acid forming a polymer in a crosslinked network which is capable upon saturation with water of absorbing from about 1 percent to about 99 percent by weight, based on the total weight of the polymer, of water.

There are commercially available both hydrophobic and hydrophilic contact lenses. The hydrophobic contact lenses available are primarily hard contact lenses made from such material as (PMMA) polymethyl methacrylate. However, there are soft contact lenses available which are hydrophilic. Furthermore, these lenses are usually water absorbing lenses and are made from polymers and copolymers based on (HEMA) hydroxyethylmethacrylate. However, neither of the materials made from PMMA or PHEMA are oxygen permeable enough to meet the oxygen requirements of the human cornea. Therefore, a material had to be developed which was soft for comfort and also oxygen permeable to the extent that when the material was made into a contact lens sufficient oxygen would pass through the material to meet all the oxygen requirements of the human cornea. It was found that polysiloxane materials are oxygen permeable to the extent that oxygen will pass through these materials when made into a contact lens sufficiently to meet the requirements of the human cornea when these materials are used to make contact lenses. Also contact lenses made from polysiloxanes are soft resulting in more comfort for the wearer. Therefore, it was found that polysiloxane materials would be good candidates for making soft contact lenses. However, it was found that when soft contact lenses were made from known polysiloxane materials these lenses do not ride on the cornea of the eye on a layer of tears but rather attach themselves to the cornea in a manner which alters the metabolic outflow and inflow of fluid from the eye. It is known that non-movement or substantially non-movement of soft contact lenses on the eye can result in physical damage to the cornea. As mentioned, it has been noted that when a soft contact lens moves on the eye there is also an exchange of tear fluid under the lens resulting in the exchange of metabolic products supplying the cornea and metabolic by-products being removed from the cornea. This movement of tear fluid results in maintaining a healthy environment for the cornea. This has been generally reported by Roth, H. W. and Iwasaki W., *Complications Caused by Silicon Elastomer Lenses in West Germany and Japan,* paper presented at the Second Contact Lens Conference, Feb. 18, 1979, in Tokyo, Japan (Prof. Motoichi Itoi, M.D., Kyoto Prefectural University of Medicine, Hirokohji, Kawara Machi-Dohri, Kamikyo-Ku, Kyoto 602); Kreiner, Christine F., Neues Optikerjournal, No. 2 (21) Feb. 10, 89 (1979); Von Arens Franz D., Neues Optikerjournal No. 3, (21) Mar. 10, 93 (1979); and Von Zimmermann E., Neues Optikerjournal, No. 4, (21) Apr. 10, 73 (1979).

It was discovered that when a soft contact lens absorbs water and is hydrophilic, that the lens will move on the eye sufficiently so that no physical damage will occur to the cornea and sufficient tear exchange will occur so that corneal metabolism will proceed normally. This has been true when observing the PHEMA lens. We believe that the movement of silicone lenses could be aided if the lenses were water absorbing. However, prior to the instant invention, except as disclosed in U.S. Pat. No. 4,136,250 which was discussed earlier, no one had discovered a polysiloxane which was water-absorbing and hydrophilic. Therefore, applicants found that all known polysiloxane soft contact lenses which applicants tested resulted in some type of adhering to the eye. This problem has been a major obstacle in preventing the use of polysiloxanes as soft contact lens material. This major obstacle has now been overcome by the instant invention. Therefore, most unexpectedly the instant polysiloxane copolymers are not only hydrophilic but are also water-absorbing. Therefore, the instant copolymers make excellent material for manufacturing contact lenses which not only do not stick to the eye but move sufficiently during normal wear so that corneal metabolism will proceed normally.

When the polysiloxane monomers of the instant invention are copolymerized with from about 5.0 percent to about 30.0 percent by weight, based on the total weight of the copolymer, of acrylic acid, a copolymer is formed which is unexpectedly transparent, hydrophilic and water-absorbing. When the copolymer was formed into contact lenses, the lenses when saturated with water unexpectedly absorbed from about 1 percent to about 99 percent by weight, based on the total weight of the copolymer, of water. This invention is a major advancement in the state of polysiloxane contact lens art.

More specifically, the instant invention comprises a soft, hydrophilic, water absorbing, flexible, fillerless, hydrolytically stable, biologically inert, transparent contact lens with the capability of transporting oxygen sufficiently to meet the requirements of the human cornea. The instant contact lens is made from a polysiloxane monomer $\alpha,\omega$ terminally bonded through divalent hydrocarbon groups to polymerized, free radical polymerizably activated, unsaturated groups copolymerized with acrylic acid forming a polymer cross-linked network, capable upon saturation with water, of absorbing from about 1 percent to about 99 percent by weight, based on the total weight of the polymer, of water.

The three-dimensional network copolymer products of the instant invention are readily prepared by means of conventional free radical polymerization techniques. The monomers together with about 0.05 to about 4.0 percent, preferably 0.05 to 2.0 percent by weight of an appropriate free radical initiator may be heated to a temperature of from about 30° C. to about 100° C. to initiate and complete the polymerization. The polymerizable monomers can preferably be subjected at room temperature to radiation by UV light in the presence of suitable activators such as benzoin, acetopheonone, benzophenone and the like for a sufficient time so as to form a three-dimensional polymer network.

The polymerization can be carried out directly in contact lens molds or can be cast into discs, rods, or sheets which can then be fabricated to a desired shape. Preferably the polymerization is carried out while the material is being spin cast, such as, taught in U.S. Pat. No. 3,408,429.

When the term "movable soft contact lens" is used herein it is meant that when the lens is placed on the eye and during normal wear the lens will move at least 0.5 mm with each blink of the eyelid. Preferably the lens should move from about 0.5 mm to about 1.0 mm with each blink.

Further, when the term "movable soft contact lens" is used herein, it is meant that the lens moves sufficiently on the eye so that (1) no physical damage occurs to the cornea and (2) sufficient tear fluid exchange occurs under the lens so that sufficient cornea metabolic activity is maintained resulting in a healthy environment for the cornea.

When the term "non-movable soft contact lens" is used herein it is meant that the lens will move less than about 0.5 mm with each blink of the eyelid.

When the term "hydrophilic soft contact lens" is used herein it is meant that the soft contact lens surface will not repel water as opposed to the "hydrophobic" where the lens surface will tend to repel water.

When the term "water absorbing soft contact lens" is used herein it is meant that the lens will absorb from about 1 percent to about 99 percent by weight, based on the total weight of the polymer, of water.

DESCRIPTION OF THE DRAWING

The attached graph illustrates the amount of water absorbed relative to the acrylic acid content of the copolymer of this invention.

DESCRIPTION OF PREFERRED EMBODIMENTS

In accordance with the preferred embodiments of this invention shaped articles for use in biomedical applications including contact lenses are provided which are fabricated from three-dimensional network copolymers comprising a polysiloxane monomer $\alpha,\omega$ terminally bonded through divalent hydrocarbn groups to polymerized, free radical polymerizably activated, unsaturated groups copolymerized with from about 5.0 percent by weight to about 30.0 percent by weight based on the total weight of the copolymer of acrylic acid forming a polymer in a crosslinked network capable of absorbing from about 1 percent to about 99 percent by weight, based upon the total weight of the copolymer, of water.

The preferred amount of water absorbed is from about 5.0 percent to about 99 percent by weight, based on the total weight of the polymer, of water.

The preferred amount of acrylic acid is from about 8.0 percent to about 15.0 percent by weight based on the total weight of the copolymer.

As mentioned, the contact lenses of the instant invention are made from a copolymer comprising the polysiloxane monomers disclosed herein copolymerized with acrylic acid. However, other monomers may be used in addition to the polysiloxane monomers and acrylic acid to form the water absorbing polymers, e.g., terpolymers of the instant invention. Any monomer or mixtures of monomers which will (1) copolymerize with methylmethacrylate and (2) are soluble or compatible with the instant disclosed polysiloxanes and (3) when polymerized with the instant siloxanes do not form separate domains, which scatter visible light, are useful as comonomers. The following monomers are merely examples illustrating those which may be used:
cyclohexylacrylate,
cinnamylmethacrylate,
cinnamyl acrylate,
cyclohexylmethacrylate,
phenoxyethyl methacrylate,
phenoxyethylacrylate,
t-butyl-styrene,
vinyl toluene,
methacrylic acid,
acrylonitrile,
allyl methacrylate,
allyl acrylate,
n-vinyl pyrrolidone,
isopropyl acrylate,
isoamyl acrylate,
2 chloroethyl methacrylate,
cyclopentylacrylate,
n decylacrylate,
phenylacrylate,
tetrahydrofurfurylacrylate,
benzyl acrylate,
hexafluoroisopropyl acrylate,
naphthylacrylate.

The above monomers may be copolymerized in solution. A particularly preferred solvent is p-xylene.

The preferred amount of additional monomers, either alone or mixtures thereof, is from about 1 percent to about 30 percent by weight based on the total weight of the polymer.

When the terms "activated" or "free radical polymerizably activated" are used with the term "unsaturated groups" herein, it is meant that an unsaturated group which is activated is one which has a substituent which facilitates free radical polymerization. These activated unsaturated groups are polymerized to form the polymers of the instant invention. Preferably, the activating groups used herein lend themselves to polymerization under mild conditions, such as, ambient temperatures.

When the term copolymerization is used herein, it is meant the simultaneous polymerization of two or more monomers. When the term copolymer is used here, it is meant a polymer having at least two different monomers incorporated into the polymer.

When the statement is made "a polysiloxane monomer $\alpha,\omega$ terminally bonded through divalent hydrocarbon groups to polymerized free radical polymerizably activated unsaturated groups" it is meant that the polysiloxane monomer as described herein has been attached to a compound having a divalent hydrocarbon group, such as methylene or propylene, etc. and then at each end of this compound is attached an activated unsaturated group such as methacryloxy, etc. and this then is the most preferred polysiloxane monomer. The activated unsaturated groups when polymerized form copolymers which are crosslinked.

When the term monomer is used herein with the term polysiloxanes it is meant to include polysiloxanes endcapped with polymerizable unsaturated groups. Preferably these monomers may be poly(organosiloxane)

monomers and polyparaffinsiloxane monomers. The process of lengthening the siloxane portion of the monomer is referred to herein as siloxane ring insertion. The chain length of the polysiloxane center unit of the monomers may be as high as 800 or more.

When the term polymerization is used herein, we refer to the polymerization of the double bonds of the siloxanes end-capped with polymerizable unsaturated groups along with acrylic acid which results in a cross-linked three-dimensional water absorbing polymeric network. This polymerization may include another monomer or mixtures of other monomers in addition to the siloxane monomers and acrylic acid.

The relative hardness or softness of the contact lenses of this invention can be varied by decreasing or increasing the molecular weight of the monomeric polysiloxane end-capped with the activated unsaturated groups or by varying the percent and type of the comonomer. As the ratio of siloxane units to end cap units increases, the softness of the material increases. Conversely, as this ratio decreases the rigidity and hardness of the material increases.

As is well established, the oxygen transportability of polysiloxanes is substantially greater in comparison to the conventional contact lens polymers such as polymethyl methacrylate (PMMA) or polyhydroxyethylmethacrylate (PHEMA). The oxygen transportability of the materials of this invention can be varied by altering the percentage of siloxane units in the polysiloxane monomer. For example, a high percentage of siloxane units results in a product more capable of transporting oxygen as compared with a lower percentage of siloxane units which results in a material with less ability to transport oxygen.

In the accompanying drawing, the amount of water absorbed by the siloxane copolymer based on the acrylic acid content is shown.

Up the lefthand side of the drawing is shown the percent of water by weight based on the total weight of the polymer contained in the composition starting with zero percent and progressing in increments of 4 percent. Across the bottom of the drawing is weight percent of acrylic acid used as a comonomer. The acrylic acid is reacted with a polysiloxane monomer as prepared in Example II and Example V of the instant application. An example of the acrylic acid/polysiloxane copolymerization is illustrated by Example VI. The repeating

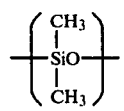

unit in the siloxane monomer is 50 and 240. The point shown in the lower left portion of the graph illustrates that when 3 percent acrylic acid is copolymerized with 97 percent of the siloxane monomer as prepared in Example V that this copolymer contains 0.17 percent water by weight based on the total weight of polymer. The next point on this curve is a point which represents a copolymer comprising 5 percent acrylic acid monomer copolymerized with 95 percent siloxane monomer. This shows that this copolymer contains 0.86 percent water by weight based on the total weight of the polymer. The next point on this curve illustrates copolymerizing 17 percent acrylic acid with 83 percent of the siloxane monomer as prepared in Example V. The copolymer contains 59.7 percent water by weight based on the total weight of the polymer. The fourth point on this curve illustrates a copolymer formed by copolymerizing 20 percent acrylic acid with 80 percent of the siloxane monomer as prepared in Example V resulting in a copolymer which contains 101.6 percent by weight of water based on the total weight of the polymer.

The next curve shown in the figure illustrates copolymerizing acrylic acid with the polysiloxane monomer as prepared in Example II. The first point on this curve illustrates reacting 5 percent acrylic acid with 95 percent of the polysiloxane monomer as prepared in Example II resulting in a copolymer which contains 2.17 percent water by weight based on the total weight of polymer. The next point on this curve illustrates a copolymer which is formed by copolymerizing 11 percent acrylic acid with 89 percent of the polysiloxane monomer as formed in Example II resulting in a copolymer which contains 5.26 percent water by weight based on the total weight of the polymer. The next point on this curve illustrates a copolymer which is formed by copolymerizing 17 percent acrylic acid with 83 percent of the monomer as prepared in Example II resulting in a copolymer which contains 18.51 percent water by weight based on the total weight of the polymer. The next point on this curve illustrates a copolymer forming by copolymerizing 20 percent acrylic acid with 80 percent of the polysiloxane monomer as formed in Example II resulting in a copolymer which contains 23.64 percent water by weight based on the total weight of the polymer.

It is evident from the figure that as the acrylic acid monomer is increased, the amount of water which can be retained by the copolymer is also increased.

The preferred polysiloxane monomers are selected from the group consisting of a poly(organosiloxane) monomer having the formula

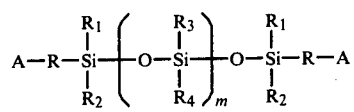

wherein A is an activated unsaturated group, R is a divalent hydrocarbon radical having from 1 to about 22 carbon atoms, $R_1$, $R_2$, $R_3$ and $R_4$ can be the same or different and each is one of a monovalent hydrocarbon radical or a halogen substituted monovalent hydrocarbon radical each having from 1 to about 12 carbon atoms and m is 0 or greater and a polyparaffinsiloxane monomer having the formula

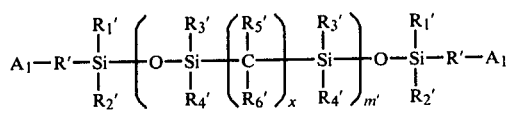

wherein $A_1$ is an activated unsaturated group; $R'$ is a divalent hydrocarbon radical having from 1 to about 22 carbon atoms; $R'_1$, $R'_2$, $R'_3$ and $R'_4$ can be the same or different and are selected from the group consisting of a monovalent hydrocarbon radical having from 1 to about 12 carbon atoms and a halogen substituted monovalent hydrocarbon radical having from 1 to about 12 carbon atoms; $R'_5$ and $R'_6$ can be the same or different and are selected from the group consisting of hydrogen, a hydrocarbon radical containing from 1 to about 12 carbon atoms, a carboxylic acid group, a carboxylic acid ester group represented by the formula

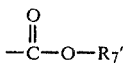

wherein $R'_7$ is selected from the group consisting of a hydrocarbon group containing from 1 to about 12 carbon atoms and a carboxylic acid amide represented by the formula

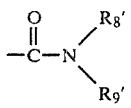

wherein $R'_8$ and $R'_9$ can be the same or different and each is selected from the group consisting of hydrogen and a hydrocarbon group containing from 1 to about 12 carbon atoms; x is 2 or greater and m' is 1 or greater.

The most preferred polysiloxane monomer is a poly(organosiloxane) monomer having the formula

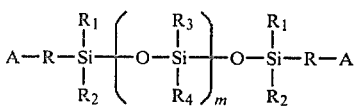

wherein m is preferably 50 to 800 and more preferably 50 to 200; wherein A is one of 2-cyanoacryloxy

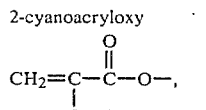

acrylonitryl

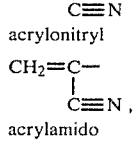

acrylamido

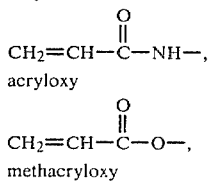

acryloxy $$CH_2=CH-\overset{O}{\underset{\|}{C}}-O-,$$

methacryloxy

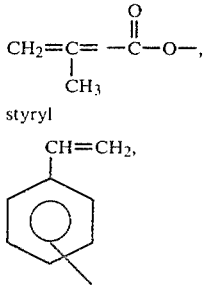

styryl

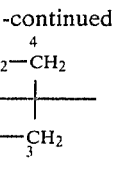

and
N-vinyl-2-pyrrolidinone-x-yl
wherein x may be 3, 4 or 5

-continued $$CH_2=CH-N\begin{matrix}\overset{5}{CH_2}-\overset{4}{CH_2}\\ \diagup\\ \diagdown\\ \underset{\|}{C}-\underset{3}{CH_2}\\ O\end{matrix}$$

More preferably A is acryloxy or methacryloxy. However, other groups containing activated unsaturation can be readily employed, such groups being well known to those skilled in the art. Most preferably A is methacryloxy or acrylamido.

R may be preferably an alkylene radical. Therefore, preferably R is methylene, propylene, butylene, pentamethylene, hexamethylene, octamethylene, dodecylmethylene, hexadecylmethylene and octadecylmethylene; arylene radicals such as phenylene, biphenylene and the corresponding alkylene and arylene radicals. More preferably R is an alkylene radical having about 1, 3 or 4 carbon atoms. Most preferably R is an alkylene radical having from about 3 to 4 carbon atoms, e.g., butylene.

Preferably, $R_1$, $R_2$, $R_3$ and $R_4$ are alkyl radicals having from 1 to 12 carbon atoms, e.g., methyl, ethyl, propyl, butyl, octyl, dodecyl and the like; cycloalkyl radicals, e.g., cyclopentyl, cyclohexyl, cycloheptyl and the like; mononuclear and binuclear aryl radicals, e.g., phenyl, naphthyl and the like; aralkyl radicals, e.g., benzyl, phenylethyl, phenylpropyl, phenylbutyl and the like; alkaryl radicals, e.g., tolyl, xylyl, ethylphenyl and the like; haloaryl radicals such as chlorophenyl, tetrachlorophenyl, difluorophenyl and the like; halo substituted lower alkyl radicals having up to about four alkyl carbon atoms such as fluoromethyl and fluoropropyl. More preferably $R_1$, $R_2$, $R_3$ and $R_4$ are methyl radicals and phenyl radicals, most preferably $R_1$, $R_2$, $R_3$ and $R_4$ are methyl radicals.

The most preferred monomers, the activated unsaturated group end-capped poly(organosiloxane) monomers, employed in this invention can be prepared by equilibrating the appropriately substituted disiloxane, for example, 1,3-bis(4-methacryloxybutyl) tetramethyl disiloxane, with a suitable amount of a cyclic diorganosiloxane, e.g., hexamethyl cyclotrisiloxane, octaphenyl cyclotetrasiloxane, hexaphenylcyclotrisiloxane, 1,2,3-trimethyl-1,2,3-triphenylcyclotrisiloxane, 1,2,3,4-tetramethyl-1,2,3,4-tetraphenylcyclotetrasiloxane and the like in the presence of an acid or base catalyst. The degree of softness, the physical properties such as tensile strength, modulus and percent elongation desired will determine the amount of cyclic diorganosiloxane equilibrated with the disiloxane. By increasing the amount of cyclic siloxane one increases m.

The reaction between a cyclic diorganosiloxane and disiloxanes, although not specifically disclosed for the disiloxanes employed in this invention as to provide the activated unsaturated groups as the end caps for polysiloxanes, is a conventional reaction and described by, for example, Kojima et al. Preparation of Polysiloxanes Having Terminal Carboxyl or Hydroxyl Groups, J. Poly. Sci., Part A-1, Vol. 4, pp 2325–27 (1966) or U.S. Pat. No. 3,878,263 of Martin issued Apr. 15, 1975, incorporated herein by reference.

The following reactions represent the most preferred poly(organosiloxane) monomer materials of the instant invention. 1,3-bis(hydroxyalkyl) tetramethyl disiloxane dimethacrylates are prepared by the following reactions: (1) esterification with acryloyl or methacryloyl chloride or anhydride. For example, the following is with methacryloyl chloride:

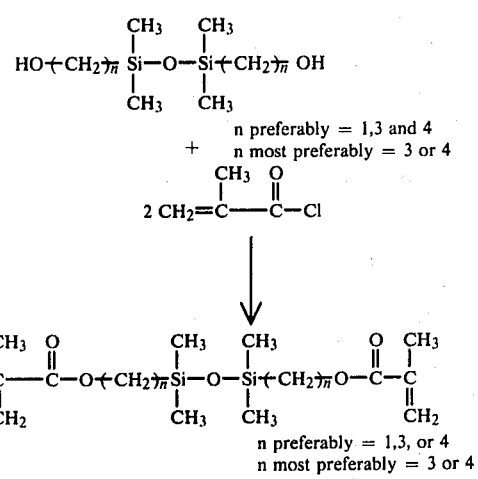

(2) Another most preferred method of preparing 1,3-bis(hydroxyalkyl) tetramethyl disiloxane dimethacrylates is by transesterification with methyl methacrylate:

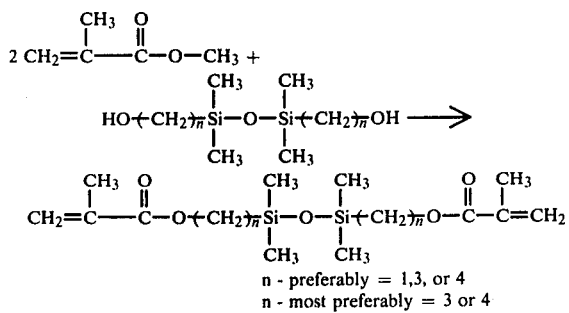

Then the number of siloxane groups between the two methacrylate caps can be increased by a ring opening insertion reaction with X moles of octamethyl cyclotetrasiloxane or 1,1,3,3-tetramethyl-1,3-disila-2-oxacyclopentane or mixtures thereof as follows:

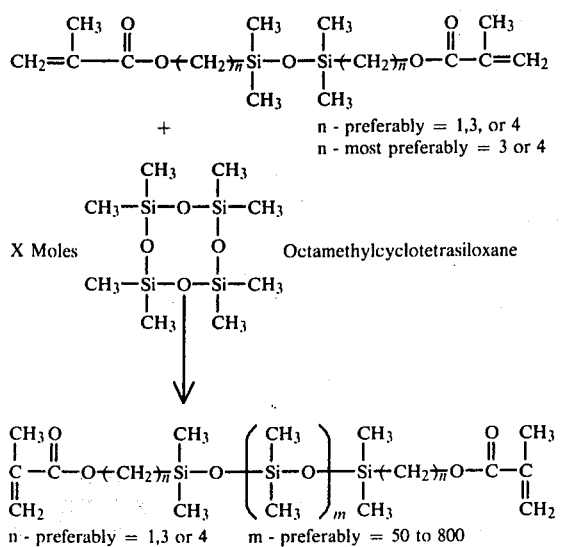

n - most preferably = 3 or 4

The above structure, i.e., a poly(organosiloxane) monomer, represents the most preferred polysiloxane monomer of the instant invention.

Preferably m is from about 50 to about 800. More preferably m is from about 50 to about 200.

When the term "soft" is used herein to describe the contact lenses of the instant invention it is meant that m, in the above formula, after polymerization, is more than 25, preferably from about 50 to about 800.

Also, the preferred polysiloxane monomers of this invention may be a polyparaffinsiloxane monomer having the formula:

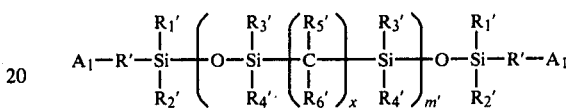

wherein $A_1$ is an activated unsaturated group; $R'$ is a divalent hydrocarbon radical having from 1 to about 22 carbon atoms; $R'_1$, $R'_2$, $R'_3$ and $R'_4$ can be the same or different and are selected from the group consisting of a monovalent hydrocarbon radical having from 1 to about 12 carbon atoms and a halogen substituted monovalent hydrocarbon radical having from 1 to about 12 carbon atoms; $R'_5$ and $R'_6$ can be the same or different and are selected from the group consisting of hydrogen, a hydrocarbon radical containing from 1 to about 12 carbon atoms, a carboxylic acid group, a carboxylic acid ester group represented by the formula

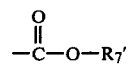

wherein $R'_7$ is selected from the group consisting of a hydrocarbon group containing from 1 to about 12 carbon atoms and a carboxylic acid amide represented by the formula:

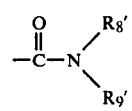

wherein $R'_8$ and $R'_9$ can be the same or different and each is selected from the group consisting of hydrogen and a hydrocarbon group containing from 1 to about 12 carbon atoms; x is 2 or greater and m' is 1 or greater. Preferably m' is 1 to 800 and more preferably 25 to 500.

More preferably A' may be

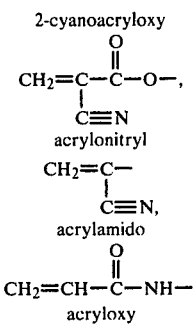

-continued $$CH_2=CH-\overset{\overset{O}{\|}}{C}-O-,$$
methacryloxy $$CH_2=\underset{\underset{CH_3}{|}}{C}=\overset{\overset{O}{\|}}{C}-O-,$$
styryl

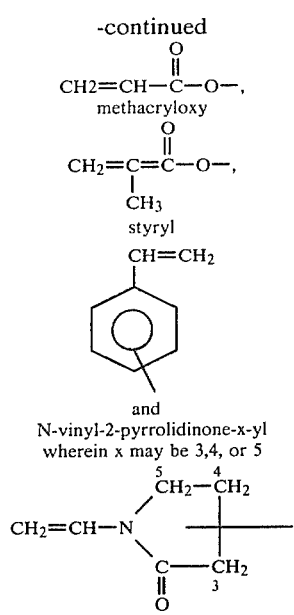

and
N-vinyl-2-pyrrolidinone-x-yl
wherein x may be 3,4, or 5

$$CH_2=CH-N\begin{matrix}\overset{5}{CH_2}-\overset{4}{CH_2}\\ \\ \underset{\|}{\underset{O}{C}}-CH_2\end{matrix}\Big|_3$$

More preferably A' is acryloxy or methacryloxy. However, other groups containing activated unsaturation can be readily employed, such groups being well known to those skilled in the art. Most preferably A' is methacryloxy or acrylamido.

R' may be preferably an alkylene radical. Therefore, preferably R' is methylene, propylene, butylene, pentamethylene, hexamethylene, octamethylene, dodecylmethylene, hexadecylmethylene and octadecylmethylene; arylene radicals such as phenylene, biphenylene and the corresponding alkylene and arylene radicals. More preferably R' is an alkylene radical having about 1,3 or 4 carbon atoms. Most preferably R' is an alkylene radical having from about 3 to 4 carbon atoms, e.g., butylene.

Preferably $R'_1$, $R'_2$, $R'_3$ and $R'_4$ are alkyl radicals having from 1 to 12 carbon atoms, e.g., methyl, ethyl, propyl, butyl, octyl, dodecyl and the like; cycloalkyl radicals, e.g., cyclopentyl, cyclohexyl, cycloheptyl and the like; mononuclear and binuclear aryl radicals, e.g., benzyl, phenylethyl, phenylpropyl, phenylbutyl and the like; alkaryl radicals, e.g., tolyl, xylyl, ethylphenyl and the like; haloaryl radicals such as chlorophenyl, tetrachlorophenyl, difluorophenyl and the like; halo substituted lower alkyl radicals having up to about four alkyl carbon atoms such as fluoromethyl and fluoropropyl. More preferably $R'_1$, $R'_2$, $R'_3$ and $R'_4$ are methyl radicals and phenyl radicals, most preferably $R'_1$, $R'_2$, $R'_3$ and $R'_4$ are methyl radicals.

Preferably $R'_5$ and $R'_6$ are selected from the group consisting of hydrogen, hydrocarbon containing from 1 to about 6 carbon atoms and a carboxylic acid group. More preferably $R'_5$ and $R'_6$ are selected from the group consisting of hydrogen and methyl.

Preferably $R'_7$ is a hydrocarbon group containing from 1 to about 6 carbon atoms. Most preferably $R'_7$ is methyl.

Preferably $R'_8$ and $R'_9$ are selected from the group consisting of hydrogen and a hydrocarbon containing from 1 to about 4 carbon atoms. Most preferably $R'_8$ and $R'_9$ are selected from the group consisting of hydrogen and methyl.

The polyparaffinsiloxane monomers employed in this invention can be prepared by equilibrating the appropriately substituted disiloxane, for example, 1,3-bis(4-methacryloxybutyl) tetramethyl disiloxane, with a suitable amount of cyclic paraffinsiloxanes as described in Piccoli, et al, *J. Am. Chem. Soc.*, "Highly Strained Cyclic Paraffin-Siloxanes" Vol. 82, p. 1883–1885 (Apr. 20, 1960). The degree of softness, the physical properties such as tensile strength, modulus and percent elongation desired will determine the amount of cyclic organoparaffinsiloxane equilibrated with the disiloxane. By increasing the amount of cyclic paraffin-siloxane one increases m'.

The reaction between a cyclic paraffin-siloxane and disiloxanes, although not specifically disclosed for the disiloxanes employed in this invention as to provide the activated unsaturated groups as to the end caps for polyparaffinsiloxanes, is a conventional reaction and described by, for example, in Merker U.S. Pat. No. 3,041,362 issued June 26, 1962 incorporated herein by reference.

The following reactions represent the most preferred materials of the instant invention. 1,3-bis(hydroxyalkyl) tetramethyl disiloxane dimethacrylates are prepared by the following reactions: (1) esterification with acryloyl or methacrylol chloride or anhydride. For example, the following is with methacrylol chloride:

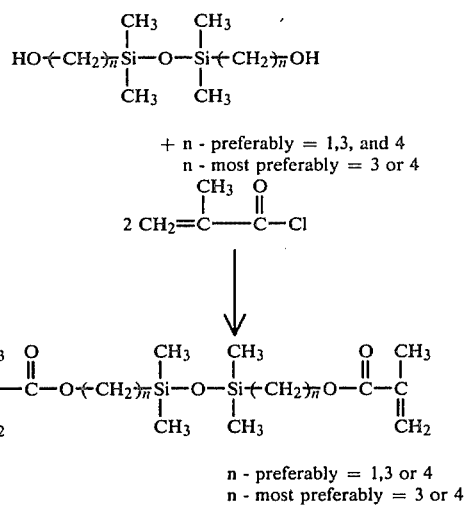

n - preferably = 1,3 or 4
n - most preferably = 3 or 4

(2) Another most preferred method of preparing 1,3-bis(hydroxyalkyl) tetramethyl disiloxane dimethacrylates is by transesterification with methyl methacrylate:

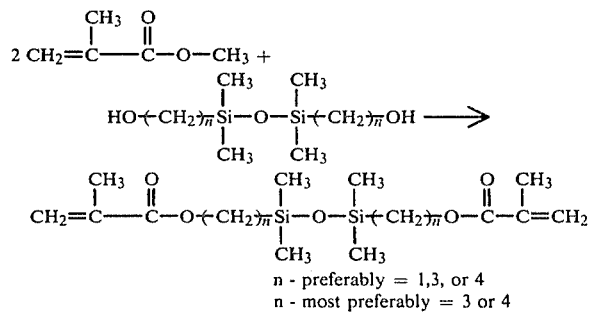

n - preferably = 1,3, or 4
n - most preferably = 3 or 4

Then the paraffin-siloxane groups between the two methacrylate caps can be inserted by a ring opening insertion reaction with 1,1, 3,3-tetramethyl-1,3-disila-2- oxacyclopentane and/or octamethylcyclotetrasiloxane or mixtures thereof as follows:

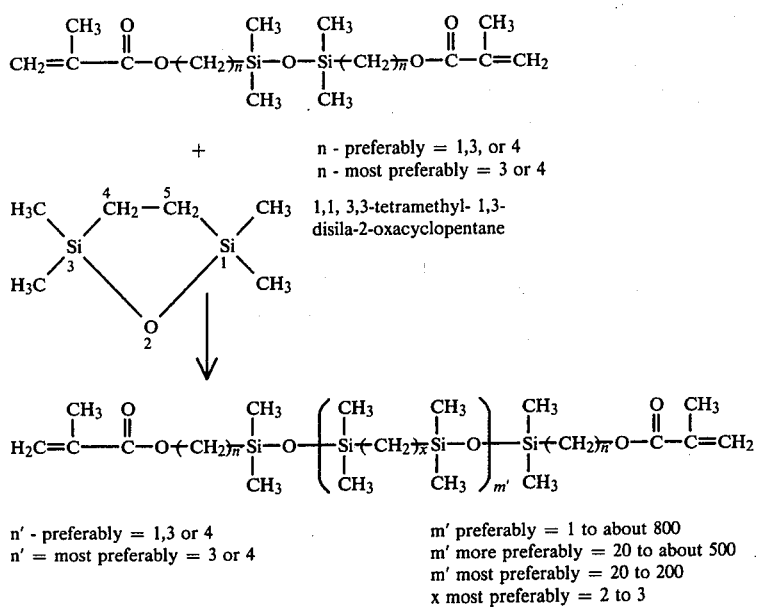

n' - preferably = 1,3 or 4
n' = most preferably = 3 or 4 m' preferably = 1 to about 800
m' more preferably = 20 to about 500
m' most preferably = 20 to 200
x most preferably = 2 to 3

The above structural formula represents the preferred polyparaffinsiloxane monomer of the instant invention.

These polyparaffinsiloxane monomers when copolymerized with acrylic acid can be readily cured to cast shapes by conventional methods such as UV polymerization, or through the use of free radical initiators plus heat. Illustrative of free radical initiators which can be employed are bis(isopropyl) peroxydicarbonate, azobisisobutyronitrile, acetyl peroxide, lauroyl peroxide, decanoyl peroxide, benzoyl peroxide, tertiarybutyl peroxypivalate and the like.

In order to further control the properties of the copolymers of the instant invention one can polymerize a mixture of the polyparaffinsiloxane monomers comprising polyparaffinsiloxane monomers having a low value of m' and polyparaffinsiloxane monomers having a high value for m' with acrylic acid. When m' in the polyparaffinsiloxane monomers has a relatively high value, i.e., above 25, the resulting contact lenses or biomedical devices are soft, hydrophilic, water absorbing, oxygen transporting, flexible, hydrolytically stable, biologically inert, transparent, resilient, and do not need fillers to improve the mechanical properties. All the monomers should have preferably a molecular weight low enough so that the viscosity is low enough to spin cast the monomers, e.g., about 175 stokes or below measured in Gardner viscosity tubes. Preferably m' is about 1 to 800 and more preferably 20 to 500.

Preferably the acrylic acid is present in amounts from about 5.0 percent by weight to about 30.0 percent by weight based on the total weight of the copolymer.

The advantages of using the instant copolymers for making the soft contact lens of the instant invention are numerous. However, most importantly and unexpectedly the soft contact lens of the instant invention are not only hydrophilic but water absorbing. As mentioned, the art teaches that polysiloxanes are generally hydrophobic. There are a few exceptions in the art where it is taught that certain polysiloxanes are hydrophilic. However, only in U.S. Pat. No. 4,136,250 and in the instant invention is it taught that a polysiloxane may be water absorbing. As a result of the instant polysiloxanes being water absorbing, soft contact lenses made from these polysiloxanes will not attach themselves to the cornea. The polysiloxane soft contact lens art has been greatly advanced by this discovery. Now, the otherwise very desirable polysiloxane soft contact lens can be worn without physically damaging the eye.

Further advantages of using the polysiloxane monomers are (1) the advantages of using activated vinyl terminal groups to cure the siloxane material which permit rapid cure at preferably room temperature if suitable initiators are used. This is desirable since the preferred method of casting the contact lens is spin casting. (2) No fillers are need to get useful physical strength as is common with most silicone resins. This is desirable since the use of fillers requires that other possibly undesirable materials be added to the composition in order to match the refractive index of the polymer to that of the filler. (3) Furthermore, the polysiloxane monomers and the copolymers of the instant invention are oxygen transporting. This is important if the material is to be used for contact lenses. The human cornea requires about $2 \times 10^{-6}$ cm$^{-3}$/(sec.cm$^2$atm.) of oxygen through the contact lens as reported by Hill and Fatt, *American Journal of Optometry and Archives of the American Academy of Optometry*, Vol. 47, p. 50, 1970. When m' is at least about 4 the chain of siloxane is long enough in the instant composition to exceed the oxygen transportability requirements of the cornea and other living tissue. However, in specific situations m' may be as low as 1. Because of the unique properties of the contact lenses of the instant invention m or m' in the polysiloxane monomers should be great enough to allow sufficient oxygen transportability and at the same time will retain its desirable properties of elasticity, tear resistance, flexibility, resilience and softness.

When the terms "oxygen transportability", "oxygen transporting" or "oxygen permeable" are used in the instant application it is meant that the material in the lens will allow sufficient transmission of oxygen through itself to supply the necessary oxygen requirements of the human cornea and other living tissue. The oxygen requirement for the human cornea, as mentioned, is about $2 \times 10^{-6}$ cm$^3$/(sec.cm$^2$atm.). The oxygen transportability was determined by a special test procedure described in conjunction with the explanation of Table I. (4) These soft contact lenses are hydrolytically stable meaning that when the contact lenses or devices are placed into an aqueous solution, e.g., in the eye, or during the disinfecting step, i.e., water plus heat, the lenses will not change significantly in chemical composition, i.e., hydrolyze and cause the lenses to change shape resulting in an undesirable change in optics. (5) The contact lenses of the instant invention are also resilient. When the term "resilient" is used herein it is meant that after the lenses have been deformed the lenses or devices will return quickly to their original shape. (6) The lenses are preferably made by spin casting, e.g., by the method as disclosed in U.S. Pat. No. 3,408,429. Monomers which have extremely high viscosities may present a problem during spin casting. However, generally the higher the molecular weight of the polysiloxane monomers the more desirable are the oxygen transporting properties. The longer the chain length and the higher the molecular weight the higher the viscosity of the monomers. However, if spin casting is to be used the viscosity of the polysiloxane monomers must be such that these materials can be spin cast. The polysiloxane monomers of the instant invention can have molecular weights high enough to give all the desirable properties when polymerized but low enough to be spin cast while still in the monomeric form. The preferred weight average molecular weight is from about 4,000 to 60,000 for the polysiloxane monomers of the instant invention. (7) The contact lenses of the instant invention are soft. By the use of the term "soft" in the instant application is meant that the lenses should have a Shore hardness of about 60 or below on the A scale. (8) The preferred contact lenses of the instant invention should be flexible. When the term "flexible" is used herein, it is meant that the contact lens is capable of being folded or bent back upon itself without breaking.

The most preferred contact lens of the instant invention is a soft, hydrophilic, water absorbing, fillerless, oxygen transporting, flexible, hydrolytically stable, biologically inert, transparent, resilient polymeric contact lens comprising a polysiloxane monomer $\alpha,\omega$ terminally bonded through divalent hydrocarbon groups to polymerized free radical polymerizably activated unsaturated groups copolymerized with acrylic acid. The polysiloxane monomer used to make the copolymer from which the contact lens is made has the preferred formulas selected from the group consisting of a poly(organosiloxane) monomer with the formula

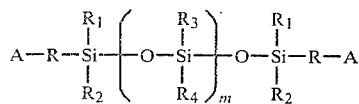

wherein A is selected from the group consisting of methacryloxy and acryloxy, R is an alkylene radical having from about 3 to about 4 carbon atoms and m is from about 50 to 800 and a polyparaffinsiloxane monomer with the formula

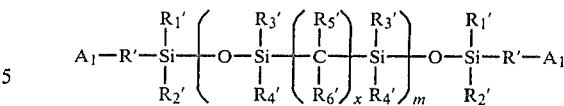

wherein $A_1$ is selected from the group consisting of methacryloxy and acryloxy; R' is an alkylene radical having from 3 to 4 carbon atoms; R'$_1$, R'$_2$, R'$_3$ and R'$_4$ can be the same or different and are monovalent hydrocarbon radicals having from 1 to about 12 carbon atoms; R'$_5$ and R'$_6$ are hydrogen atoms, x is 2 or 3 and m' is 20 to 500.

The most preferred contact lenses of the instant invention, as mentioned, are hydrophilic, water absorbing, have an oxygen transport rate of at least about $2 \times 10^{-6}$ cm$^3$/(sec.cm$^2$atm.), are hydrolytically stable, biologically inert, transparent, resilient, and have a softness preferably of about 60 or below on the Shore hardness A scale. Most preferably the Shore hardness should be 25 to 35 on the A scale. To further illustrate the most preferred contact lenses of the instant invention's physical properties, the tensile modulus of elasticity should be about 500 g/mm$^2$ or less. If the material is to be used as contact lenses then the Shore hardness and modulus may be related to the comfort of the lenses to the wearer when used on the human eye.

Another advantage of the preferred embodiment, i.e., soft contact lenses, of the instant invention is that lenses made from the copolymers of the instant invention can be made large enough to cover the entire cornea of the eye resulting in more comfort. Hard contact lenses, such as PMMA lenses, have to be made smaller due to their poor oxygen transportability. Furthermore, the larger the lenses, the easier it is to locate the optical center of the lenses. The larger the lens the easier it is to maintain the optical axis which is required in making special lenses, e.g., for those persons with astigmatism. Another advantage of the preferred soft lenses of the instant invention is that the instant preferred soft lenses can have a softness similar to HEMA lenses but, in addition, and most importantly, are more oxygen permeable, i.e., are capable of transporting more oxygen and can be made water absorbing to the same extent as the HEMA lenses. HEMA lenses are not oxygen permeable or capable of transporting oxygen to a degree necessary to meet all the requirements of the human cornea.

When the word "oxygen permeable" is used herein it means that the instant copolymers will transport oxygen at a rate of at least about $2 \times 10^{-6}$ cm$^3$/(sec.cm$^2$atm.).

While the copolymers of the instant invention can be used to prepare contact lenses these copolymers can also be employed for other uses, such as, shaped articles for use in biomedical applications. These copolymers can be used to make biomedical devices, i.e., shaped articles, such as dialyzer diaphragms, to prepare artificial kidneys and other biomedical implants, such as disclosed in Wichterle, U.S. Pat. No. 2,976,576 and Wichterle, U.S. Pat. No. 3,220,960. The instant copolymers can also be used in preparing medical surgical devices, e.g., heart valves, vessel substitutes, intrauterine devices, membranes and other films, dialyzer diaphragms, catheters, mouth guards, denture liners and other such devices as disclosed in Shephard U.S. Pat. No. 3,520,949 and Shephard U.S. Pat. No. 3,618,231. The instant copolymers can be used to modify collagen to make blood vessels, urinary bladders and other such devices as disclosed in Kliment U.S. Pat. No. 3,563,925. The instant copolymers can be used to make catheters as disclosed in Shephard U.S. Pat. No. 3,566,874. The copolymers can be used as semipermeable sheets for dialysis, artificial dentures and all of such disclosures as set forth in Stoy U.S. Pat. No. 3,607,848. The instant polymers and copolymers can be used in ophthalmic prostheses and all other uses disclosed in Wichterle U.S. Pat. No. 3,679,504.

When the terms "shaped article for use in biomedical applications" or "biomedical device" are used herein it is meant that the materials disclosed herein have physiochemical properties rendering them suitable for prolonged contact with living tissue, blood or the mucous membrane such as would be required for biomedical shaped articles, such as, surgical implants, blood dialysis devices, blood vessels, artificial ureters, artificial breast tissue and membranes intended to come in contact with body fluid outside of the body, for example, membranes for kidney dialysis and heart/lung machines, and the like. It is known that blood, for example, is rapidly damaged in contact with artificial surfaces. The design of a synthetic surface which is antithrombogenic and nonhemolytic to blood is necessary for prosthesis and devices used with blood. The copolymers are compatible with living tissue.

The copolymers disclosed herein can be boiled and/or autoclaved in water without being damaged whereby sterilization may be achieved. Thus, an article formed from the instant copolymers disclosed herein may be used in surgery where an article compatible with living tissue or with the mucous membrane may be used.

The following examples are illustrative only and should not be construed as limiting the invention. All parts and percents referred to herein are on a weight basis and all viscosities measured at 25° C. unless otherwise specified.

EXAMPLE I 557 g of 1,3-bis(4-hydroxybutyl) tetramethyl disiloxane, 634 g of dry pyridine and 2 liters of hexane are charged to a 5 liter reaction flask equipped with a mechanical stirrer and drying tube. The mixture is chilled to 0° C. and then 836 g of methacryloyl chloride is added dropwise. The mixture is agitated continuously overnight. The reaction solution is extracted consecutively with 10% water solutions of HCl and NH$_3$ in order to remove excess reagents and pyridine hydrochloride. The resulting solution of the product in hexane is dried with anhydrous MgSO$_4$, filtered, and solvent removed at reduced pressure. About 459 g (55% yield) of 1,3-bis(4-methacryloxybutyl) tetramethyl disiloxane is collected. The structure is confirmed by infrared spectra, proton magnetic resonance spectra and elemental analysis. IR spectra shows no intense hydroxyl band between 3100 and 3600 cm$^{-1}$ but does show strong methacrylate absorptions at 1640 and 1720 cm$^{-1}$. PMR spectra agreed with the proposed structure:

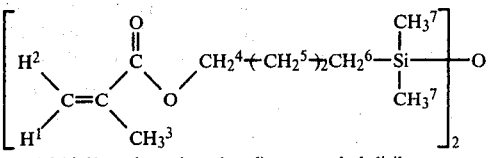

| 1,3-bis(4-methacryloxy butyl) tetramethyl disiloxane. | | | |
|---|---|---|---|
| Proton | ppm | Integrated Area | Multiplicity |
| H$^1$ | 7.0$_5$ | 1 | singlet |
| H$^2$ | 6.5$_0$ | 1 | singlet |
| H$^3$ | 3.0$_0$ | 3 | singlet |
| H$^4$ | 5.1$_5$ | 2 | triplet |
| H$^5$ | 2.7 | 4 | multiplet |
| H$^6$ | 1.6$_5$ | 2 | triplet |
| H$^7$ | 1.2$_0$ | 6 | singlet |

Elemental analysis gave 13.6% Si (Calc. 13.5%), 58.1% C (Calc. 57.9%) and 9.4% H (Calc. 9.2%). The product was a clear, colorless, fragrant fluid.

EXAMPLE II 589.75 g of octamethylcyclotetrasiloxane and 10.25 g of 1,3-bis(4-methacryloxybutyl) tetramethyl disiloxane as prepared in Example I are charged into a reaction vessel equipped with a mechanical stirrer. About 25 g of Fuller's Earth and 1.35 ml of conc. H$_2$SO$_4$ are mixed and added to the vessel with continuous stirring while bubbling dry N$_2$ through the reaction mixture. The charge is warmed to 60° C. and stirred for two days, at which time the viscous fluid is neutralized with Na$_2$CO$_3$, diluted with hexane, and filtered. The hexane/monomer solution is washed with water, dried with MgSO$_4$ (anhydrous) and solvent removed at reduced pressure. Low molecular weight unreacted cyclic siloxanes are removed by heating the monomer to 110° C. at 0.2 mm Hg in a rotary evaporator. The product obtained is an odorless, colorless, clear fluid of 8.5 stokes viscosity measured in Gardner Viscosity tubes. The monomer comprised about 240 repeating Me$_2$SiO units. Fluid collected during the devolatilizing of the product shows no methacrylate absorptions in IR spectra and could not be cured.

IR spectra of the monomer shows a slight methacrylate absorption and broad siloxane absorptions between 1000 and 1100 cm$^{-1}$, indicative of linear poly(dimethyl siloxanes) with the following formula:

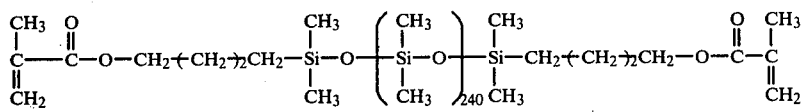

EXAMPLE III

Films of the fluid product of Example II are cast between glass plates by adding 0.2% bis(isobutyl) peroxy dicarbonate to the monomer and heating for ½ hour at 40° C., ½ hour at 60° C. and ¼ hour at 80° C. The glass plates are separated. The films are then kept at 80° C. for 15 minutes. The properties of this film are recorded in Table I as D material.

EXAMPLE IV 96.9 g 1,1,3,3,-tetramethyl-1,3-disila-2-oxacyclohexane available from Silar Labs, 10 Alplaus Road, Scotia, N.Y. 12302, and 3.1 g 1,3-bis(4methacryloxybutyl) tetramethyl disiloxane as prepared in Example I are charged to a 200 ml round bottom polymerization flask. 1.3 ml trifluoromethanesulphonic acid available from Aldrich Chemical Company is added to the polymerization flask and the flask stoppered. An increase in the viscosity of the flask's contents and the evolution of heat are noted 2 to 3 minutes after the addition of the acid to the flask. The flask's contents are agitated on a shaker overnight. Next the polymerization is quenched by the addition of 10 g Na₂CO₃. Hexane is added to the viscous product and the solution filtered to remove the insoluble salts. The hexane solution of the product is then washed three times with water and dried over MgSO₄. The hexane is removed from the product at reduced pressure. The viscosity of the product as measured with Gardner viscosity tubes is 910 stokes. The number average and weight average molecular weights as measured by gel permeation chromatography are 12,300 and 31,700 respectively. The structure of the clear colorless product approximates that of the following formula:

110° C. at 0.15 mmHg in a thin film evaporator. The purified polymer comprises about 48–52 repeating

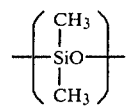

units. The following is a formula for the above monomer:

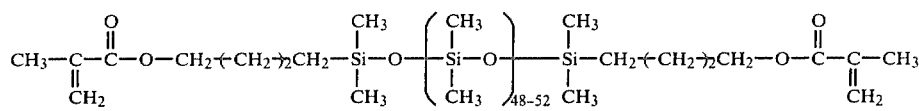

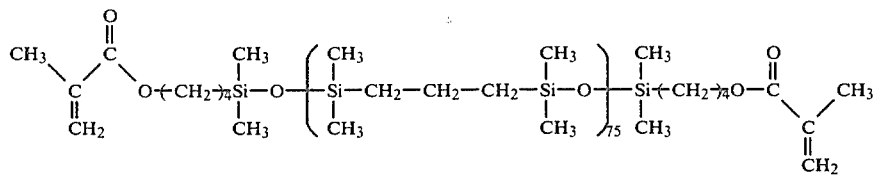

EXAMPLE V 999.5 gm of octamethylcyclotetrasiloxane and 111.18 gm of 1,3 bis(4-methacryloxybutyl)tetramethyl disiloxane are charged into a reaction vessel equipped with a mechanical stirrer. 2.78 gm of trifluoromethanesulfonic acid is added to the vessel with continuous stirring while bubbling dry nitrogen through the reaction mixture. The reactants are stirred, at ambient temperature, overnight. The monomer is then passed through an activated alumina column (F20) to remove the acid catalyst. The low molecular weight unreacted cyclic siloxanes are removed by heating the prepolymer to

EXAMPLE VI 89 parts of the monomer as prepared in Example II is mixed with 11 parts of acrylic acid and 3 parts of tert-butyl peroctoate. After vigorous stirring the solution is degassed by putting the solution under vacuum (5 ml Hg) until the air bubbles are removed. A casting cell is prepared by putting a separator around the periphery of one lite. The lite is a 3"×4" flat piece of ⅛" thick glass. The solution is poured onto the lite. The lite is then covered with another piece of glass, i.e., lite, forming a cell (sandwich). The cell is clamped together so that no voids or bubbles are entrapped in the cell. The filled cell is placed in an oven at 80° C. for ½ hours. The temperature in the oven is then raised to 100° C. The cell is kept at that temperature for one hour. Then the cell is separated and the film removed for subsequent treatment and testing as shown in Table I.* All the various copolymers with test results shown in Table I were prepared as in this Example. It has been found advisable to extract the film with methylene chloride, then 10% aqueous solution of sodium hydroxide. After a thorough distilled water rinse, the film is completely wettable and ready for testing.

TABLE I

| 1 Monomer | 2 Wt. % | 3 Monomer | 4 Wt. % | 5 Tensile | 6 Modulus | 7 Elong % | ASTM 1938 8 Initial | 9 Prop | 10 ASTM 1004 Tear | 11 Trans | 12 Ratio | 13 % H₂O | 14 % H₂O |
|---|---|---|---|---|---|---|---|---|---|---|---|---|---|
| A | 95 | C | 5 | 47 | 75 | 99 | 2.3 | 1.9 | 37 | 10.7 | 19 | 2.12 | 2.17 |
| *A | 89 | C | 11 | 63 | 83 | 129 | 2.1 | 1.8 | 99 | 10.0 | 17 | 5.0 | 5.25 |
| A | 83 | C | 17 | 40 | 65 | 103 | 1.6 | 1.4 | 24 | 11.2 | 20 | 15.62 | 18.51 |
| A | 80 | C | 20 | 35 | 69 | 81 | 1.9 | 1.6 | 21 | 12.1 | 21 | 19.12 | 23.64 |
| B | 98 | C | 3 | 70 | 364 | 21 | 2.6 | 2.1 | 15 | 9.9 | 17 | 0.17 | 0.17 |
| B | 95 | C | 5 | 67 | 352 | 20 | 2.5 | 2.1 | 16 | 11.4 | 20 | 0.85 | 0.86 |
| B | 83 | C | 17 | 69 | 421 | 18 |  |  | 28 | 9.0 | 16 | 37.4 | 59.7 |
| B | 80 | C | 20 | 57 | 332 | 18 |  |  | 17 | 7.2 | 13 | 50.4 | 101.6 |
| PHEMA |  |  |  | 40 | 40 | 150 |  |  |  | 4 | 1 | 40 | 66.67 |
| **D | 100 |  |  | 150 | 72 | 177 |  |  |  |  |  | ca. 0.1 | ca. 0.1 |

A monomer prepared as in Example II
B monomer prepared as in Example V

*prepared in Example VI
**prepared in Example III
All above tested copolymers prepared as in Example VI TABLE I-continued

| 1 Monomer | 2 Wt. % | 3 Monomer | 4 Wt. % | 5 Tensile | 6 Modulus | 7 Elong % | ASTM 1938 | | 10 ASTM 1004 Tear | 11 Trans | 12 Ratio | 13 % H₂O | 14 % H₂O |
|---|---|---|---|---|---|---|---|---|---|---|---|---|---|
| | | | | | | | 8 Initial | 9 Prop | | | | | |

Column 5 = g/mm²

Column 6 = g/mm²

Column 11 (Trans) =
Apparent Oxygen Transport Rate =

$$\frac{Cm^3(O_2)}{sec. \, cm^2 \, atm.} = Trans \times 10^{-6}$$

Column 12 = $\frac{\text{Oxygen transport of sample}}{\text{Oxygen transport of HEMA}}$ Column 13 = % by weight of water absorbed based on the total weight of the polymer plus water Column 14 = % by weight of water absorbed based on the total weight of the polymer.

In Table I in the first column, the letter A represents the polysiloxane monomer as prepared in Example II, the letter B represents the polysiloxane monomer as prepared in Example V and the letter D represents the polysiloxane polymer as prepared in Example III. PHEMA is polyhydroxyethyl methacrylate.

Column 2 of Table I shows the percent of siloxane monomer present.

Column 3 of Table I shows acrylic acid present.

These copolymers were prepared as illustrated in Example VI.

Column 5 shows tensile strength which was measured using ASTM D1708. Tensile strength is measured in g/mm².

Column 6 is the tensile modulus which is measured according to ASTM D1708 in g/mm².

Column 7 of Table I is percent elongation. This is measured according to ASTM D1708.

Column 8 and 9 of Table I shows tear strength. Tear strength is measured in g/mm thickness. Initial tear strength is shown in column 8 and tear strength after the tear begins is shown in column 9. The initial tear strength represents a certain force which starts the tear. However, it takes less tear force to keep the tear moving. Therefore, the second number in column 9 is a prolongation force, i.e., the force necessary to keep the tear going. The tear tests were conducted in accordance with ASTM 1938.

Column 10 of Table I represents tear strength as conducted in accordance with ASTM D1004. This is again another measure of tear strength and shows tear strength in g/mm thickness.

Column 11 of Table I represents oxygen transmission times 10⁻⁶. This oxygen transmission was determined by the following technique. The test is measuring the oxygen permeability of a material while it is wet with water. This is an attempt to simulate the conditions of a contact lens when on the human eye. Two chambers filled with water at 32° C. are connected together by passageway. Across this passageway is placed the material to be tested. Nitrogen-purged water is pumped into both chambers until the oxygen concentration is very low, (below about 0.04 PPM). Then water containing air (oxygen concentration about 8 ppm) is introduced into the lower chamber. There is located in the upper chamber an oxygen sensing electrode which measures oxygen diffused from the lower chamber, through the membrane being tested, into the upper chamber. This measures apparent oxygen transport rate of the material in the passageway between the two chambers.

Column 12 shows how many times more oxygen permeable the instant material is than the control material PHEMA polyhydroxyethylmethacrylate, i.e., HEMA hydrogel.

Most importantly, column 13 of Table I shows the percentage of water by weight based on the total weight of the water plus polymer contained in the material.

Column 14 of Table I shows the percentage of water by weight based on the total weight of the polymer contained in the material.

These tests are conducted by using first an extraction procedure. This procedure consists of placing the film to be tested which is about 2" by 3" in size in 100 cc of methylene chloride. A glass rod is used to keep the film submerged in the methylene chloride. Then the film is removed and placed between paper towels and then dried at 80° C. for 15 minutes. The film is then placed into 100 cc of 10% sodium hydroxide in deionized water for one hour. Then the film is rinsed for about 5 minutes with deionized water. The film is then stored in deionized water until used. The test procedure for determining the percent of water in the film is as follows. A sample about 0.3 grams in weight is taken from the above hydrated film. The film is roller dried and immediately weighed to the nearest milligram. The weighed film is placed into a vacuum oven. A vacuum is drawn to about one centimeter Hg. The sample is maintained at a temperature of about 80° C. overnight. The next day the material is cooled and the vacuum broken by admitting dried air. After the sample and weighing jar are at room temperature for about 15 minutes, the sample is weighed to the nearest milligram.

The percent of water is calculated as follows for column 13:

$$\text{Percent Water} = \frac{\text{wet weight} - \text{dry weight}}{\text{wet weight}} \times 100$$

The percent of water is calculated as follows for column 14:

$$\text{Percent Water} = \frac{\text{wet weight} - \text{dry weight}}{\text{dry weight}} \times 100$$

As illustrated in Table I it is one purpose of the instant invention to increase the percent of water absorbed by the lens while retaining high tensile strength, percent of elongation and, most importantly, retaining sufficient oxygen transportability. One problem with the prior art silicone polymers is that lenses made from this material tend to stick to the eye and cause damage to the cornea. The absorption of water by the instant polysiloxane polymer has helped overcome this problem. Another problem with the prior art silicone polymers when used to make contact lenses is that these prior art polymers are not very strong and have poor tear strength and p or tensile strength. The instant material has a high tear and tensile strength. Also one problem with the PHEMA (control) is that contact lenses made from this material do not have the necessary oxygen transporting properties to meet the oxygen requirements of the human cornea. As mentioned, the oxygen requirement of the human cornea is about $2\times 10^{-6}$ cm$^3$/(sec.cm$^2$atm.). Table I illustrates the effect the instant copolymers have on the percent of water absorbed by the copolymers and terpolymers.

In the case of modulus, it would be most preferred if the modulus is below 500 in order to obtain a soft contact lens. Therefore, generally the lower the modulus the softer the contact lens.

As to elongation, it is generally preferred that elongation be high.

As to oxygen transport, it is desirable that this rate be maximized. This rate should be greater than the rate of oxygen required for the human cornea.

The tensile strength test, the modulus test, and elongation tests are measured, as mentioned, with an Instron Tester ASTM D1708. The samples had no prior conditioning and were in standard "dog bone" shapes which were cut from 0.2 mm thick film. The speed is 0.25 inches per minute.

EXAMPLE VII 89 parts of the monomer as prepared in Example II are mixed with 11 parts of acrylic acid and 3 parts of diethoxyacetophenone. About 30 µl of the mixture is placed in a spinning contact lens mold under N$_2$ atmosphere. After 20 minutes irradiation with UV light, a cured contact lens is obtained. The lens formed is water absorbing, hydrophilic, optically clear, elastic and strong.

EXAMPLE VIII

30 µl of the fluid product as prepared in EXAMPLE VII is placed in a suitable contact lens spin casting mold and spin cast under polymerizable conditions to a contact lens such as taught in U.S. Pat. No. 3,408,429. The lens is water absorbing, hydrophilic, optically clear, elastic and strong.

We claim:

1. A soft, hydrophilic, water absorbing, flexible, fillerless, hydrolytically stable, biologically inert, transparent contact lens with the capability of transporting oxygen sufficiently to meet the requirements of the human cornea comprising a polysiloxane monomer α,ω terminally bonded through divalent hydrocarbon groups to polymerized, free radical, polymerizably activated, unsaturated groups copolymerized with acrylic acid forming a polymer in a crosslinked network capable upon saturation with water of retaining from about 1 percent to about 99 percent by weight, based on the total weight of the polymer, of water wherein the polysiloxane monomer is selected from the group consisting of a poly(organosiloxane) monomer having the formula

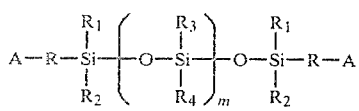

wherein A is an activated unsaturated group, R is a divalent hydrocarbon radical having from 1 to about 22 carbon atoms, R$_1$, R$_2$, R$_3$ and R$_4$ can be the same or different and are selected from the group consisting of a monovalent hydrocarbon radical or a halogen substituted monovalent hydrocarbon radical each having from 1 to 12 carbon atoms and m is from about 50 to about 800 and the polyparaffinsiloxane monomer having the formula

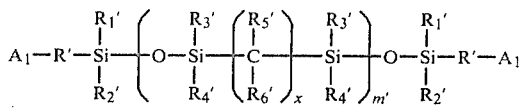

wherein A$_1$ is an activated unsaturated group; R' is a divalent hydrocarbon radical having from 1 to about 22 carbon atoms; R'$_1$, R'$_2$, R'$_3$ and R'$_4$ can be the same or different and are selected from the group consisting of a monovalent hydrocarbon radical having from 1 to about 12 carbon atoms and a halogen substituted monovalent hydrocarbon radical having from 1 to about 12 carbon atoms; R'$_5$ and R'$_6$ can be the same or different and are selected from the group consisting of hydrogen, a hydrocarbon radical containing from 1 to about 12 carbon atoms, a carboxylic acid group, a carboxylic acid ester group represented by the formula

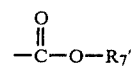

wherein R'$_7$ is selected from the group consisting of a hydrocarbon group containing from 1 to about 12 carbon atoms and a carboxylic acid amide represented by the formula

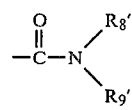

wherein R'$_8$ and R'$_9$ can be the same or different and each is selected from the group consisting of hydrogen and a hydrocarbon group containing from 1 to about 12 carbon atoms; x is 2 or greater and m' is from about 20 to about 500.

2. The contact lens according to claim 1 wherein the polysiloxane monomer is a poly(organosiloxane) monomer.

3. The contact lens according to claim 2 wherein m is a number of from about 50 to 200.

4. The contact lens according to claim 3 which has a Shore hardness of 60 or below on the Shore hardness scale A.

5. The contact lens according to claim 4 which has a Shore hardness of 25 to 35 on the Shore hardness scale A.

6. The contact lens according to claim 2 wherein the contact lens has a tensile modulus of elasticity of about 500 g/mm$^2$ or less.

7. The contact lens according to claim 2 which has an oxygen transportability of at least $2\times 10^{-6}$ cm$^3$/(sec.cm$^2$atm.).

8. The contact lens according to claim 2 wherein A is selected from the group consisting of 2-cyanoacryloxy, acrylonitryl, acrylamido, acryloxy, methacryloxy, styryl, N-vinyl-2-pyrrolidinone-3-yl, N-vinyl-2-pyrrolidinone-4-yl and N-vinyl-2-pyrrolidinone-5-yl and R is an alkylene radical and R$_1$, R$_2$, R$_3$ and R$_4$ is an alkyl radical having from 1 to 10 carbon atoms.

9. The contact lens according to claim 8 wherein the alkylene radical has from about 1 to about 4 carbon atoms.

10. The contact lens according to claim 9 wherein the alkylene radical has from about 3 to about 4 carbon atoms.

11. The contact lens according to claim 2 wherein $R_1$, $R_2$, $R_3$ and $R_4$ are selected from the group consisting of a methyl radical and a phenyl radical.

12. The contact lens according to claim 11 wherein $R_1$, $R_2$, $R_3$ and $R_4$ are methyl radicals.

13. The contact lens according to claim 1 wherein the polysiloxane monomer is a polyparaffinsiloxane monomer.

14. The contact lens according to claim 13 which has a tensile modulus of elasticity of about 500 g/mm$^2$ or less.

15. The contact lens according to claim 13 wherein the oxygen transportability is at least $2 \times 10^{-6}$ cm$^3$/(sec.cm$^2$atm.).

16. The contact lens according to claim 15 which has a Shore hardness of 60 or below on the Shore hardness scale A.

17. The contact lens according to claim 13 wherein x is a number from 2 to 3.

18. The contact lens according to claim 13 wherein $A_1$ is selected from the group consisting of 2-cyanoacryloxy, acrylonitryl, acrylamido, acryloxy, methacryloxy, styryl, N-vinyl-2-pyrrolidinone-3-yl, N-vinyl-2-pyrrolidinone-4-yl and N-vinyl-2-pyrro idinone-5-yl and R' is an alkylene radical and $R'_1$, $R'_2$, $R'_3$ and $R'_4$ are alkyl radicals having from 1 to 10 carbon atoms.

19. The contact lens according to claim 18 wherein the alkylene radical has from about 1 to about 4 carbon atoms.

20. The contact lens according to claim 19 wherein the alkylene radical has from about 3 to about 4 carbon atoms.

21. The contact lens according to claim 13 wherein $R'_1$, $R'_2$, $R'_3$ and $R'_4$ are selected from the group consisting of a methyl radical and a phenyl radical.

22. The contact lens according to claim 21 wherein $R'_1$, $R'_2$, $R'_3$ and $R'_4$ are methyl radicals.

23. The contact lens according to claim 22 wherein $R'_5$ and $R'_6$ are selected from the group consisting of hydrogen and methyl.

24. The contact lens according to claim 23 wherein x is a number from 2 to 3.

* * * * *

UNITED STATES PATENT AND TRADEMARK OFFICE
CERTIFICATE OF CORRECTION

PATENT NO. : 4,277,595

DATED : July 7, 1981

INVENTOR(S) : William G. Deichert et al

It is certified that error appears in the above-identified patent and that said Letters Patent are hereby corrected as shown below:

Data Page, Item 75, Second Line, delete "Gregory C. Niu and substitute ---Gregory C.C. Niu---.

Column 1, Line 35, delete the word "above" and substitute ---about---.

UNITED STATES PATENT AND TRADEMARK OFFICE
CERTIFICATE OF CORRECTION

PATENT NO. : 4,277,595

DATED : July 7, 1981

INVENTOR(S) : William G. Deichert et al

It is certified that error appears in the above-identified patent and that said Letters Patent are hereby corrected as shown below:

Column 4, Lines 5 - 40, delete the formula as shown

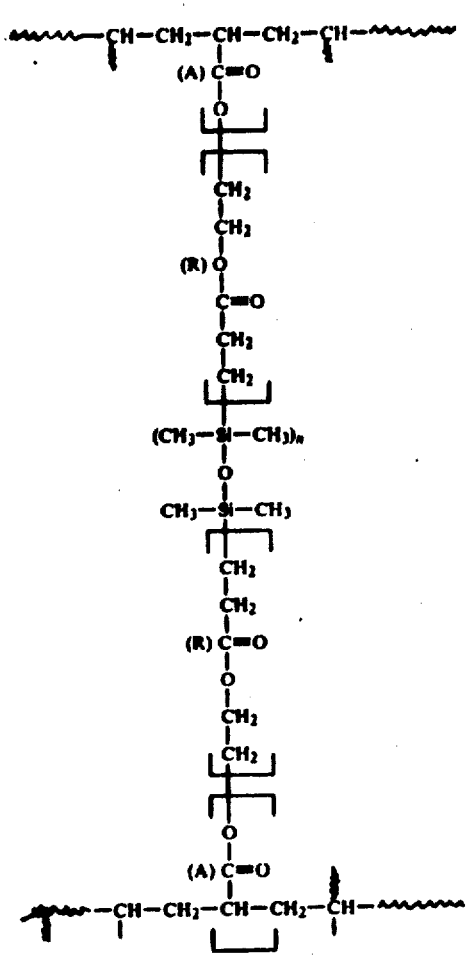

UNITED STATES PATENT AND TRADEMARK OFFICE
CERTIFICATE OF CORRECTION

PATENT NO. : 4,277,595

DATED : July 7, 1981

INVENTOR(S) : William G. Deichert et al

Page 3 of 4

It is certified that error appears in the above-identified patent and that said Letters Patent are hereby corrected as shown below:

and substitute the following formula:

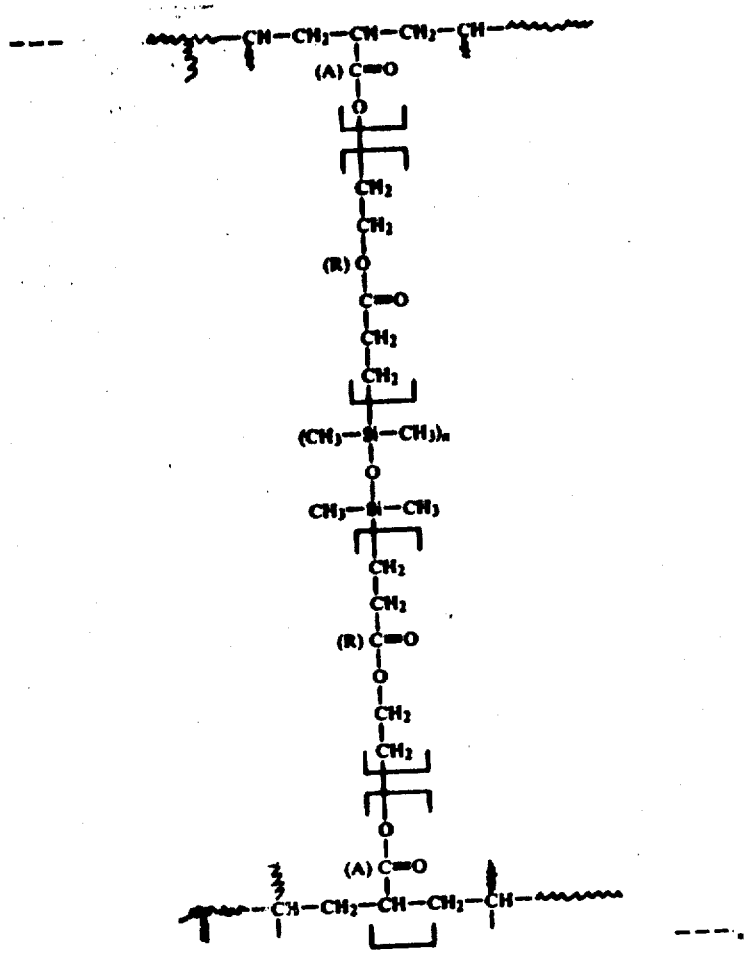

UNITED STATES PATENT AND TRADEMARK OFFICE
CERTIFICATE OF CORRECTION

PATENT NO. : 4,277,595

DATED : July 7, 1981

INVENTOR(S) : William G. Deichert et al

It is certified that error appears in the above-identified patent and that said Letters Patent are hereby corrected as shown below:

| | |
|---|---|
| Column 4, line 62, | delete the word "to" and substitute the word ---do---. |
| Column 14, line 27 | delete the word "forming" and substitute the word ---formed---. |
| Column 22, line 40, | delete the word "need" and substitute the word ---needed---. |
| Column 22, line 49, | delete "$2 \times 10^{-6} cm^{-3}/(sec.cm^2 atm.)$" and substitute ---$2 \times 10^{-6} cm^3/(sec.cm^2 atm.)$---. |
| Columns 27 and 28, TABLE I, | under the column entitled "Wt. %", the fifth entry down, delete the figure "98" and substitute the correct figure ---97---. |
| | At the end of TABLE I, directly below "B monomer prepared as in Example V", add ---C Acrylic Acid---. |

Signed and Sealed this

Twelfth Day of January 1982

[SEAL]

Attest:

GERALD J. MOSSINGHOFF

Attesting Officer   Commissioner of Patents and Trademarks